United States Patent
Aoyagi

(10) Patent No.: US 10,213,887 B2
(45) Date of Patent: Feb. 26, 2019

(54) TURRET TOOL POST AND MACHINE TOOL EQUIPPED WITH TURRET TOOL POST

(71) Applicants: Citizen Watch Co., Ltd., Tokyo (JP); Citizen Machinery Co., Ltd., Nagano (JP)

(72) Inventor: Atsushi Aoyagi, Tokyo (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days.

(21) Appl. No.: 15/129,377

(22) PCT Filed: Mar. 31, 2015

(86) PCT No.: PCT/JP2015/060046
§ 371 (c)(1),
(2) Date: Sep. 26, 2016

(87) PCT Pub. No.: WO2015/152200
PCT Pub. Date: Oct. 8, 2015

(65) Prior Publication Data
US 2017/0113313 A1    Apr. 27, 2017

(30) Foreign Application Priority Data

Mar. 31, 2014 (JP) ................. 2014-073261

(51) Int. Cl.
*B23B 29/32* (2006.01)
*B23Q 5/04* (2006.01)
(Continued)

(52) U.S. Cl.
CPC .............. *B23Q 5/10* (2013.01); *B23B 29/323* (2013.01); *B23Q 1/5406* (2013.01); *B23Q 5/04* (2013.01);
(Continued)

(58) Field of Classification Search
CPC .............. Y10T 29/5155; Y10T 408/37; Y10T 82/2587; Y10T 29/5152–29/5167;
(Continued)

(56) References Cited

U.S. PATENT DOCUMENTS

| | | |
|---|---|---|
| 4,428,781 A | 1/1984 | Norstrom |
| 6,634,264 B1 | 10/2003 | Takeuchi et al. |

(Continued)

FOREIGN PATENT DOCUMENTS

| | | |
|---|---|---|
| CN | 102689219 A | 9/2012 |
| CN | 202804769 U | 3/2013 |

(Continued)

OTHER PUBLICATIONS

Machine Translation JP 2009-202282 A, which JP '282 was published Sep. 2009.*

(Continued)

*Primary Examiner* — Erica E Cadugan
(74) *Attorney, Agent, or Firm* — Knobbe, Martens, Olson & Bear LLP

(57) ABSTRACT

A turret tool post includes a turret turnably supported by a post body, turret turning part having a turret turning shaft and the like to turn the turret, a tool attachment part turnably holding a rotatable tool and attached to the turret, and tool-attachment-part turning part turning the tool attachment part to turn the rotatable tool. The tool-attachment-part turning part and the turret turning part are provided independently and arranged to face each other. The tool-attachment-part turning part includes a tool turning motor installed inside the turret and an attachment-part transmission shaft connected to the tool turning motor.

15 Claims, 6 Drawing Sheets

(51) Int. Cl.
*B23Q 16/02* (2006.01)
*B23Q 1/54* (2006.01)
*B23Q 5/10* (2006.01)

(52) U.S. Cl.
CPC ........ *B23Q 16/02* (2013.01); *B23Q 2220/002* (2013.01); *Y10T 29/5155* (2015.01); *Y10T 409/307672* (2015.01)

(58) Field of Classification Search
CPC ..... Y10T 29/519; B23B 39/20; B23B 39/205; B23B 29/24–29/34; B23Q 2220/002; B23Q 5/04–5/20
USPC ................ 29/40, 35.5–48.5 A, 33 J; 408/35; 82/159
See application file for complete search history.

(56) References Cited

U.S. PATENT DOCUMENTS

| | | | | |
|---|---|---|---|---|
| 7,137,180 | B2 * | 11/2006 | Matsumoto | B23Q 1/5406 29/40 |
| 7,150,085 | B2 * | 12/2006 | Ishiguro | B23Q 39/02 29/39 |
| 7,395,589 | B1 | 7/2008 | Kuo | |
| 2003/0221525 | A1 | 12/2003 | Katoh et al. | |
| 2006/0064861 | A1 | 3/2006 | Ishiguro | |
| 2015/0040732 | A1 | 2/2015 | Ozawa | |
| 2017/0136550 | A1 * | 5/2017 | Aoyagi | B23B 29/24 |

FOREIGN PATENT DOCUMENTS

| | | | | |
|---|---|---|---|---|
| CN | 103447777 | A | 12/2013 | |
| CN | 104349857 | | 2/2015 | |
| CN | 107649843 | A | 2/2018 | |
| CN | 107891219 | A | 4/2018 | |
| DE | 3908586 | A1 * | 9/1990 | |
| DE | 4308419 | A1 * | 9/1994 | B23Q 39/02 |
| EP | 1122011 | A4 | 9/2002 | |
| EP | 1366851 | | 12/2003 | |
| EP | 1642676 | | 4/2006 | |
| EP | 2842669 | | 3/2015 | |
| GB | 2126134 | B | 1/1986 | |
| JP | S6374507 | | 4/1988 | |
| JP | H03-125688 | A | 5/1991 | |
| JP | 04-041102 | A | 2/1992 | |
| JP | 05-039807 | U | 2/1993 | |
| JP | 2731909 | B2 | 3/1998 | |
| JP | 3129696 | U | 3/2007 | |
| JP | 2009-202282 | A * | 9/2009 | |
| JP | 2013-226611 | | 11/2013 | |
| JP | 2014-087853 | | 5/2014 | |
| KR | 10-2010-102234 | A | 9/2010 | |
| KR | 20-0452652 | Y1 | 3/2011 | |
| KR | 10-2015-0009957 | | 1/2015 | |
| TW | 201347879 | | 12/2013 | |
| WO | WO 2009/107422 | A1 | 9/2009 | |
| WO | WO 2013/161354 | | 10/2013 | |

OTHER PUBLICATIONS

Machine translation of Japanese Patent Application No. 2012-099061, which JP '061 application was filed Apr. 24, 2012.*
Machine translation of DE 4308419, which DE '419 was published Sep. 22, 1994.*
International Search Report issued in application No. PCT/JP2015/060046 dated Jun. 30, 2015.
Extended European Search Report issued in application No. 15773807.1 dated Oct. 5, 2017.
Extended European Search Report issued in application No. 15774335.2 dated Nov. 10, 2017.
Chinese Office Action dated Feb. 12, 2018; Chinese Application No. 201580017419.0; 5 pages
Office Action issued in Korean Patent Application No. 10-2016-7030355 dated Apr. 14, 2017 in 6 pages (Being resubmitted with English Translation).
Office Action in counterpart Korean Application No. 10-2016-703030, dated Sep. 20, 2017 in 4 pages (Being resubmitted with English Translation).
Taiwanese Office Action dated Jul. 11, 2018, in Taiwanese Application No. 104110446 in 8 pages.
Decision to Grant in Korean Patent Application No. 10-2018-7019113; dated Jul. 31, 2018.
Office Action issued in Chinese Patent Application No. 2015-0017419.0, dated Nov. 1, 2018, 6 pages (with English translation).

* cited by examiner

TURRET TOOL POST AND MACHINE TOOL EQUIPPED WITH TURRET TOOL POST

CROSS-REFERENCE TO RELATED APPLICATIONS

This application is the U.S. National Phase under 35 U.S.C. § 371 of International Application No. PCT/JP2015/060046, filed Mar. 31, 2015, designating the U.S., and published in Japanese as WO 2015/152200 A1 on Oct. 8, 2015, which claims priority to Japanese Patent Application No. 2014-073261, filed Mar. 31, 2014, the entire contents of which are incorporated herein by reference.

BACKGROUND

This disclosure relates to a turret tool post and a machine tool equipped with the turret tool post.

DESCRIPTION OF THE RELATED ART

A turret tool post that is provided at an automatic lathe and includes a turret turnably supported by a post body has been known. With the turret tool post, a tool such as a bite and an end mill is turnably attached to the turret with a tool attachment part.

The above turret tool post rotates a rotatable tool attached to the tool attachment part and turns the rotatable tool relative to the turret so as to process a workpiece (see Patent Literature 1 and Patent Literature 2).

Patent Literature 1: JP3129696 U
Patent Literature 2: JP2013-226611 A

Patent Literature 1 discloses a tool post including tool-attachment-part turning means for turning the tool (tool attachment part). The tool-attachment turning means is, however, configured with a plurality of gears complicatedly connected to each other. Patent Literature 2 discloses a tool post including a turret turning drive shaft that has a cylindrical shape and transmits a turn force to the turret, a rotatable-tool drive shaft attached to the tool attachment part (tool unit), and a turning drive shaft that transmits a turn force to the tool unit to turn the rotation shaft of the tool. However, the rotatable-tool drive shaft and the turning drive shaft are attached inside the turret turning drive shaft. Namely, the structure of the turret tool post is complicated.

SUMMARY

An object of the present disclosure is, therefore, to provide a turret tool post and a machine tool post equipped with the turret tool post that can turn a tool supported by a tool attachment part relative to a turret with a simple structure.

In order to achieve the above objective, a turret tool post according to an embodiment of the present disclosure includes a post body, a turret that is turnably supported on the post body, turret turning part that is configured to turn the turret, a tool attachment part that turnably holds a tool and is attached to the turret, and tool-attachment-part turning part that is configured to turn the tool attachment part to turn the tool. The machine tool selects the tool by turning the turret and performs processing on a material by turning the tool using the tool attachment part. The tool-attachment-part turning part and the turret turning part are provided independently and arranged to oppose each other.

A machine tool according to another embodiment of the present disclosure includes the above-mentioned turret tool post.

DETAILED DESCRIPTION

Hereinafter, the present disclosure will be described with reference to illustrated embodiments.

Figure 1:
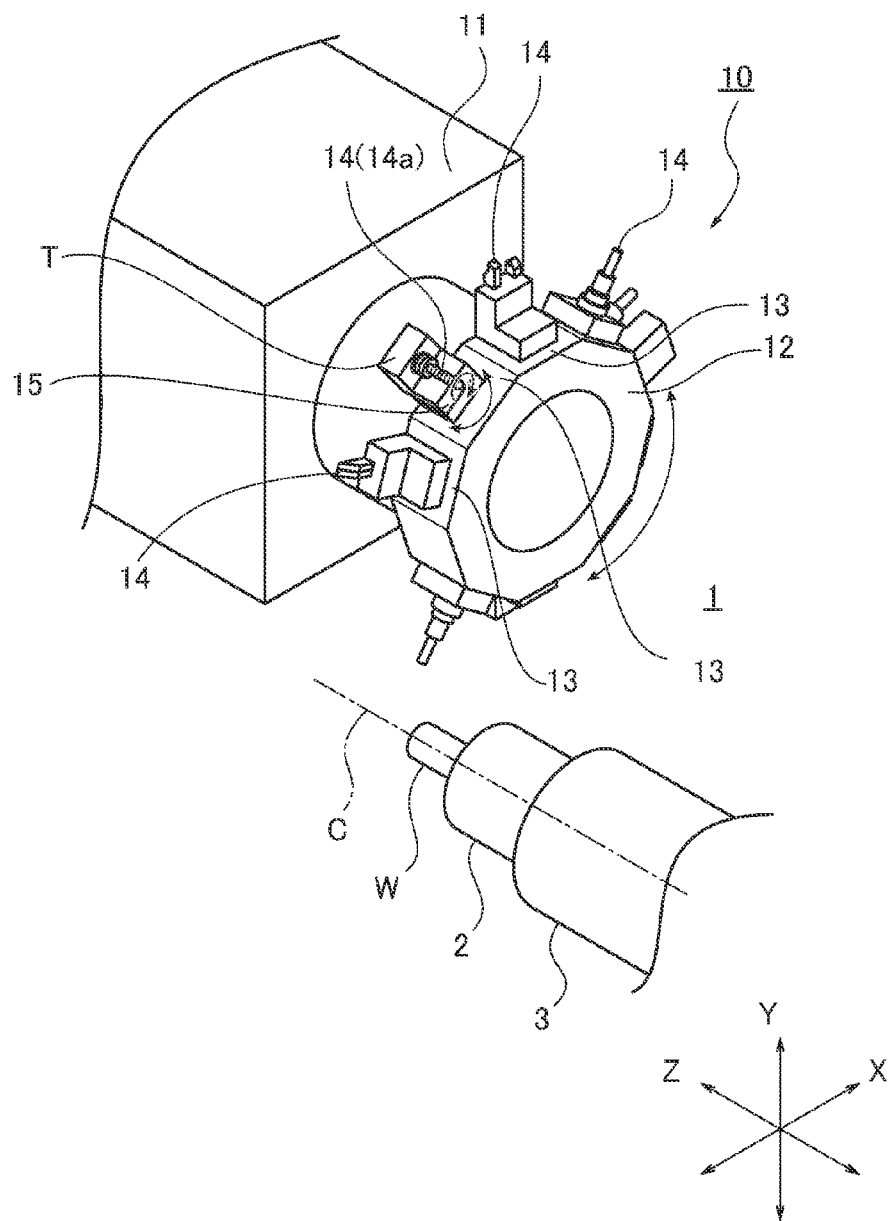
FIG. 1 is a schematic perspective view illustrating a vicinity of a main spindle of an automatic lathe, which is one example of a machine tool equipped with a turret tool post according to an embodiment, and a vicinity of the turret attached to the turret tool post.
Figure 2:
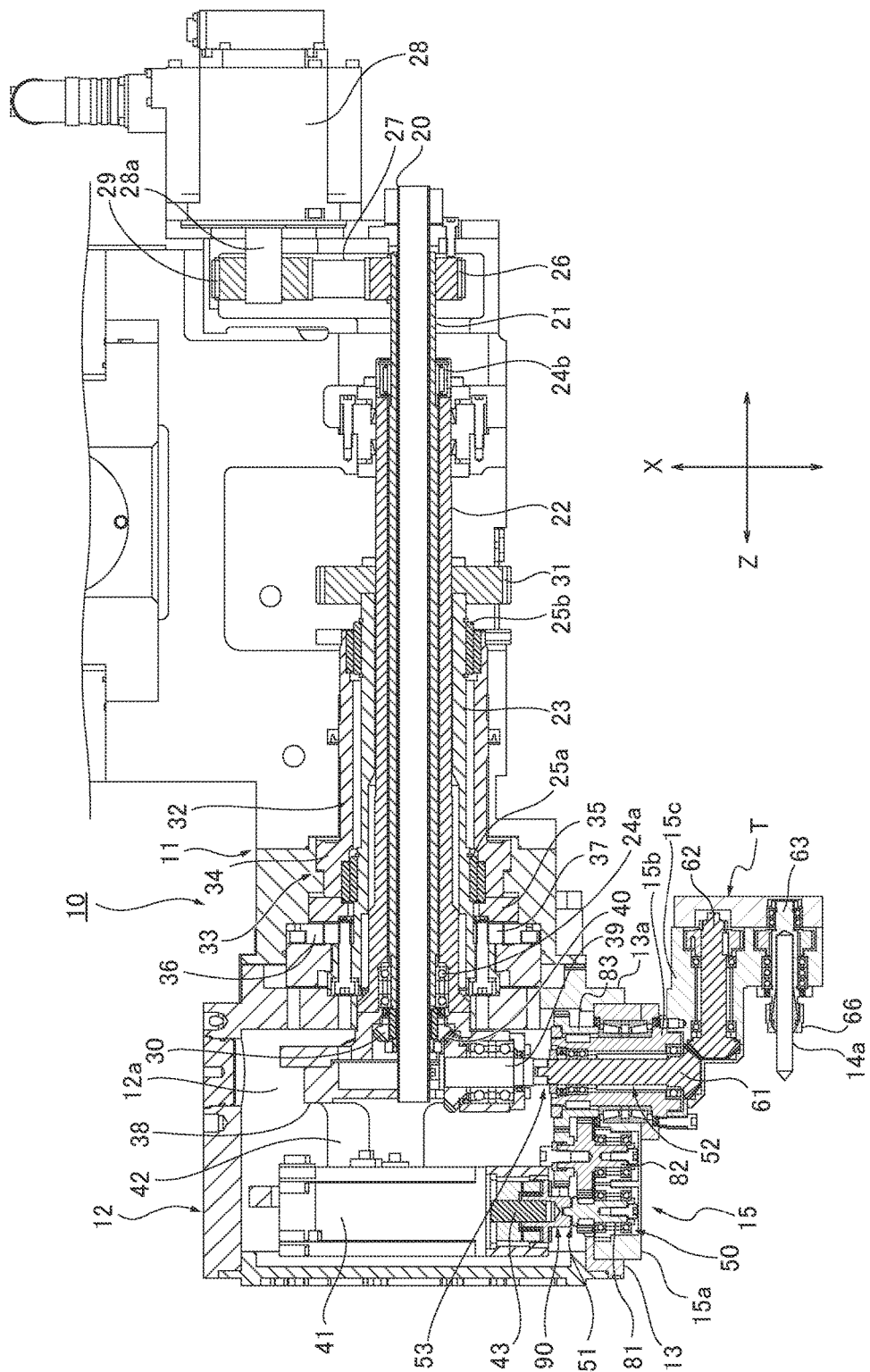
FIG. 2 is a schematic cross-sectional view along an X-axis direction illustrating an internal structure of the turret tool post according to an embodiment.

FIG. 1 is a schematic perspective view illustrating a vicinity of a main spindle of an automatic lathe, which is one example of a machine tool equipped with a turret tool post according to an embodiment. FIG. 2 is a schematic cross-sectional view illustrating an internal structure of the turret tool post according to an embodiment.

A main spindle 2 of an automatic lathe 1 is rotatably mounted on a main spindle headstock 3. A distal end part of the main spindle 2 detachably grips a workpiece W with a main spindle chuck (not illustrated). A turret tool post 10 is disposed in a vicinity of the main spindle 2. Note that in this embodiment, a direction along a main-spindle axis line C is defined as a Z-axis direction, a horizontal direction orthogonal to the Z-axis direction is defined as an X-axis direction, and an up-and-down direction orthogonal to both the Z-axis direction and the X-axis direction is defined as a Y-axis direction.

The turret tool post 10 includes a post body 11 and a turret 12 having a substantially polygonal shape. The turret 12 is supported by the post body 11 in an indexable and turnable manner. Various tools 14 are detachably attached to a plurality of turret faces 13 on the circumferential surface of the turret 12, respectively. Using the turret tool post 10 as a support, each of the tools 14 is turnably supported by the turret tool post 10 with the turret 12.

With an indexing turn of the turret 12, each of tools 14 turns and a desired tool 14 is selectively positioned at a processing position corresponding to a position of the workpiece W. Here, the post body 11 is configured to be controlled by a non-illustrated moving mechanism to move in the X, Y, and Z-axes directions. In accordance with the movement of the turret tool post 10, the workpiece W is processed by the tool 14 selected by the indexing turn of the turret 12.

As illustrated in FIG. 2, a cylindrical fixed shaft 22 is fixed inside the post body 11 along the Z-axis direction. A cylindrical tool-rotation drive shaft 21 is inserted into and rotatably supported by the fixed shaft 22 with bearings 24a, 24b. Further, a turret turning shaft 23 is rotatably fitted onto the fixed shaft 22. A pipe 20 is inserted into the tool-rotation drive shaft 21. Here, the pipe 20 is fixed to the post body 11.

A pulley 26 is attached to one distal end side (i.e., the right side on FIG. 2) of the tool-rotation drive shaft 21, and a pulley 29 is attached to a motor shaft 28a of a tool rotating motor 28. The pulley 26 and the pulley 29 are connected via a belt 27. With this, a rotation force of the tool rotating motor 28 is transmitted to the tool-rotation drive shaft 21 through the pulley 29, the belt 27, and the pulley 26. A bevel gear 30 is provided at the other distal end side (i.e., the left side on FIG. 2) of the tool-rotation drive shaft 21.

Figure 6:
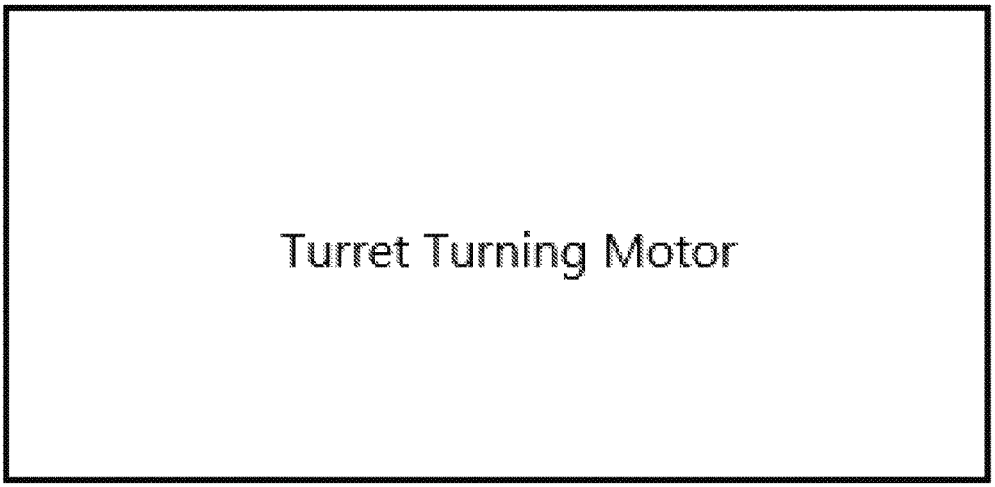
FIG. 6 is a schematic view of a turret turning motor.

A turret turning gear 31 is integrally attached to one distal end side (i.e., right side on FIG. 2) of the turret turning shaft 23. A drive force of a turret turning motor (schematically illustrated in FIG. 6) is transmitted to the turret turning gear 31. The turret 12 is integrally fixed to the other distal end side (i.e., the left side on FIG. 2) of the turret turning shaft 23. The turret 12 is turnably supported by the post body 11 with the turret turning shaft 23.

A sliding shaft 32 is fitted onto the turret turning shaft 23 with bearings 25a, 25b so as to be slidable in the Z-axis direction. The bearings 25a, 25b allow the sliding shaft 32 to slide in the Z-axis direction. At one distal end side of the sliding shaft 32, a piston 34 is formed and inserted into a cylinder chamber 33 that is formed in the post body 11. Further, a coupling element 35, which configures a coupling mechanism, is integrally fixed at the one distal end side of the sliding shaft 32. Coupling elements 36 and 37, which face the coupling element 35, are integrally fixed to the post body 11 and the turret turning shaft 23 respectively. Here, the coupling element 35, the coupling element 36, and the coupling element 37 configure the coupling mechanism.

When the sliding shaft 32 is moved to the turret head side (i.e., the left side of FIG. 2) by operating the piston 34, the coupling element 35 is engaged with the coupling elements 36, 37. The coupling element 36 fixed to the post body 11 is then engaged with the coupling element 37 fixed to the turret turning shaft 23 through the coupling element 35. Accordingly, the turn of the turret turning shaft 23 is stopped. When the sliding shaft 32 is slid to disengage the coupling element 35 from the coupling elements 36, 37, the coupling element 36 and the coupling element 37 are separated. As a result, the turret turning shaft 23 is allowed to turn.

By allowing the turret turning shaft 23 to turn and turning the turret turning shaft 23, the turret 12 is turned. The turn of the turret turning shaft 23 is then stopped at a predetermined turning angle position to achieve the indexing turn of the turret 12. With the indexing turn of the turret 12, a predetermined turret face 13 of the turret 12 is selected so as to select a desired tool 14.

A support part 38 is integrally fixed at a distal end of the fixed shaft 22. The support part 38 is positioned inside a hollow part 12a of the turret 12. The support part 38 is integrally fixed to the post body 11 with the fixed shaft 22. A tool-rotation transmission shaft 39 is rotatably supported by the support part 38. A bevel gear 40 is attached to the tool-rotation transmission shaft 39. The bevel gear 30 is engaged with the bevel gear 40. The drive force is thereby transmitted to the tool-rotation transmission shaft 39 from the tool rotation shaft 21.

At the support part 38, a tool turning motor 41 is fixed with a bracket 42 so as to be positioned inside the hollow part 12a. Note that electric lines connected to the tool turning motor 41 are led to the turret tool post 10 through the hollow pipe 20 and are connected to a controller (not illustrated).

Figure 3:
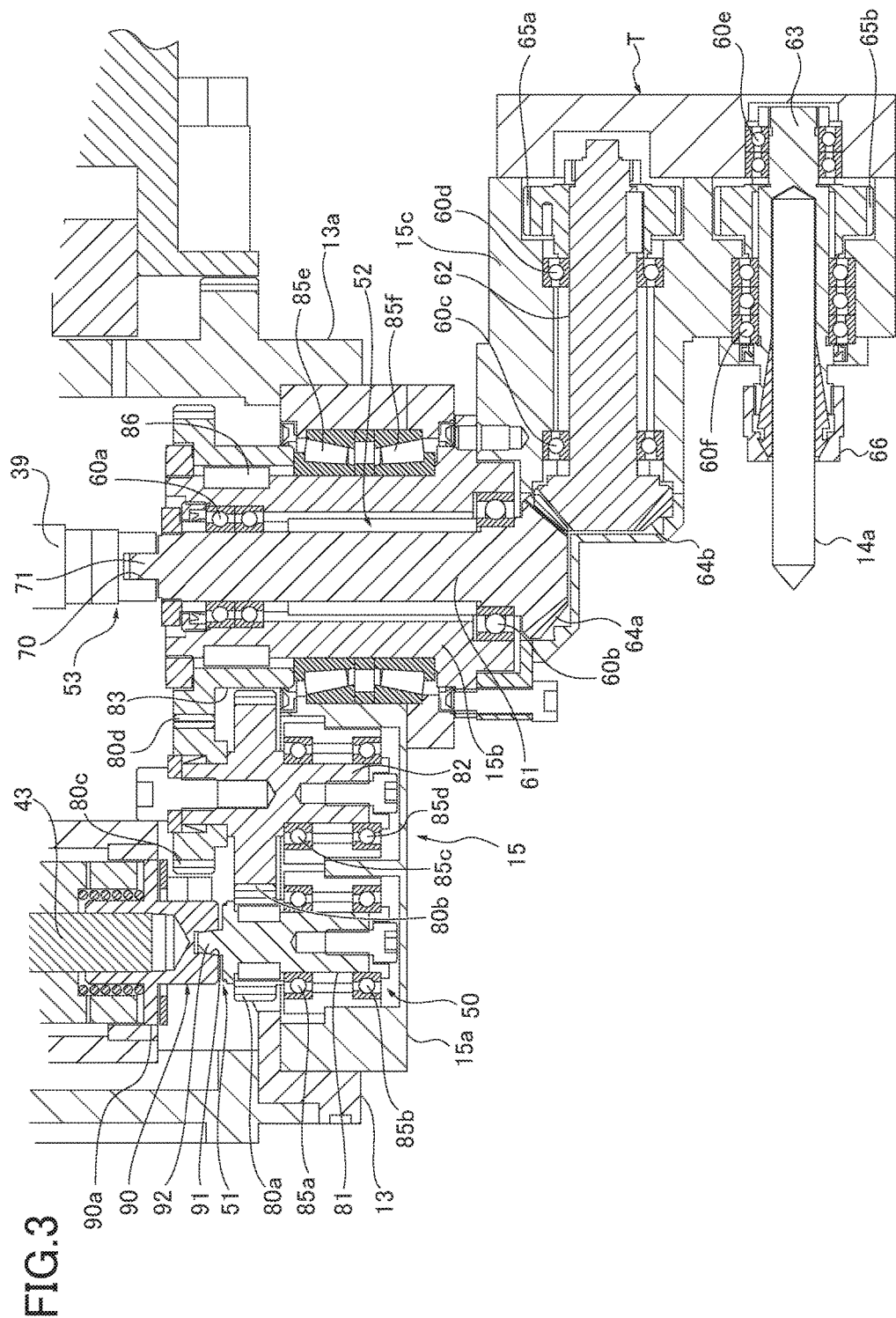
FIG. 3 is an enlarged cross-sectional view illustrating a vicinity of a tool attachment part to which a rotatable tool is attached.

As illustrated in FIGS. 2 and 3, the turret face 13 has a fixed part 13a formed in a cylindrical shape. A rotatable tool device T is detachably fixed to the fixed part 13a with a tool attachment part 15. Here, the rotatable tool device T holds a rotatable tool 14a such as a drill and an end mill as the tool 14, and the tool attachment part 15 is configured with an outer holder 15a and an inner holder 15b. The tool attachment part 15 is attached to the turret face 13 by detachable fixing the outer holder 15a to an inner circumferential surface of the fixed part 13a.

Inside the tool attachment part 15, a turn-force transmission mechanism 50 to transmit a turn force to the inner holder 15b and a rotation-force transmission mechanism 52 to transmit a rotation force to the rotatable tool 14a are provided. An attachment-part transmission shaft 90 is provided at a distal end side of a motor shaft 43 of the tool turning motor 41. Between the attachment-part transmission shaft 90 and the turn-force transmission mechanism 50, a first clutch 51 is provided. The first clutch 51 connects the attachment-part transmission shaft 90 and the turn-force transmission mechanism 50 only when the rotatable tool 14a is selected by the indexing turn of the turret 12. Here, the attachment-part transmission shaft 90 may be fixed to the motor shaft 43 by, for example, a screw or a pressure welding.

Between the other distal end side (the opposite side to the bevel gear 40) of the tool-rotation transmission shaft 39 and the rotation-force transmission mechanism 52, a second clutch 53 is provided. The second clutch 53 connects the tool-rotation transmission shaft 39 and the rotation-force transmission mechanism 52 only when the rotatable tool 14a is selected by the indexing turn of the turret 12.

The rotation-force transmission mechanism 52 includes a rotation-force transmission shaft 61. The rotation-force transmission shaft 61 is rotatably inserted into and supported by the inner holder 15b with bearings 60a, 60b. The inner holder 15b is rotatably supported by the outer holder 15a with bearings 85e, 85f. At the distal end part of the rotation-force transmission shaft 61, a bevel gear 64a is provided.

The second clutch 53 includes a groove 70 formed at the distal end of the tool-rotation transmission shaft 39 and a tenon-shaped projection 71 formed at the distal end of the rotation-force transmission shaft 61. The tenon-shaped projection 71 is engaged with (fitted to) the groove 70 when the rotatable tool 14a is selected by turning the turret 12.

When the tenon-shaped projection 71 is engaged with the groove 70, the second clutch 53 becomes in an engaged state such that the rotation force transmitted to the tool-rotation transmission shaft 39 is transmitted to the rotation-force transmission shaft 61.

The turn-force transmission mechanism 50 includes a first turn-force transmission shaft 81 having a gear 80a, a second turn-force transmission shaft 82 integrally formed with a gear 80b, a gear 80c attached to the second turn-force transmission shaft 82, and a cylindrical shaft 83 formed with a gear 80d. The gear 80a and gear 80b are engaged, and the gear 80c and 80d are engaged.

The first turn-force transmission shaft 81 is rotatably supported by the outer holder 15a with bearings 85a, 85b. The second turn-force transmission shaft 82 is rotatably supported by the outer holder 15a with bearings 85c, 85d. The cylindrical shaft 83 is integrally fixed to the inner holder 15b with a connecting member 86. Here, the bearings 60a, 60b are provided between the outer circumferential surface of the rotation-force transmission shaft 61 and the inner circumferential surface of the inner holder 15b. A device body 15c of the rotatable tool device T is detachably and integrally fixed to a distal end side of the inner holder 15b with, for example, a bolt.

The rotatable tool device T includes a first rotation-force transmission shaft 62 rotatably supported by the device body 15c with bearings 60c, 60d and a second rotation-force transmission shaft 63 rotatably supported by the device body 15c with bearings 60e, 60f. The rotatable tool 14a is detachably installed on the second rotation-force transmission shaft 63 with a chuck mechanism 66.

The first rotation-force transmission shaft 62 and the second rotation-force transmission shaft 63 are associated with each other through gears 65a, 65b, which are engaged with each other through other gears (not illustrated). The first rotation-force transmission shaft 62 has a bevel gear 64b at a distal end part thereof. When the device body 15c is fixed to the inner holder 15b, the bevel gear 64a and the bevel gear 64b are engaged to connect the rotation-force transmission shaft 61 and the first rotation-force transmission shaft 62. The rotation force is transmitted to the rotation-force transmission shaft 61 from the tool-rotation transmission shaft 39 through the second clutch 53. The rotation force is then transmitted from the rotation-force transmission shaft 61 to the rotatable tool 14a through the bevel gears 64a, 64b, the first rotation-force transmission shaft 62, the gears 65a, 65b, and the second rotation-force transmission shaft 63.

The first clutch 51 includes a recessed groove 91 and a tenon-shaped projection 92. The recessed groove 91 is formed at a distal end of the attachment-part transmission shaft 90, which is provided on the post body 11 side of the turret tool post 10. The tenon-shaped projection 92 is formed at a distal end of the first turn-force transmission shaft 81 of the turn-force transmission mechanism 50 in the tool attachment part 15 attached to the turret 12 (turret face 13), which is disposed on the rotatable tool 14a side. With this configuration, when the turret 12 turns and the rotatable tool 14a is selected by the indexing turn, the tenon-shaped projection 92 is engaged with (fitted to) the groove 91. The attachment-part transmission shaft 90 and the tool-rotation transmission shaft 39 are arranged to be substantially in parallel to each other.

When the tenon-shaped projection 92 is engaged with the groove 91, the first clutch 51 becomes in the engaged state. Accordingly, the turn force transmitted from the motor shaft 43 to the attachment-part transmission shaft 90 is transmitted to the first turn-force transmission shaft 81 through the first clutch 51, and then transmitted to the inner holder 15b through the first turn-force transmission shaft 81, the gears 80a, 80b, the second turn-force transmission shaft 82, the gears 80c, 80d, and the cylindrical shaft 83. The inner holder 15b is turned by the transmitted turn force. That is, by turning the tool attachment part 15 to turn the inner holder 15b, the rotatable tool device T is integrally turned with the inner holder 15b, and therefore the rotatable tool device T is integrally turned with the rotatable tool 14a.

As described above, tool-attachment-part turning part is configured with the tool turning motor 41 provided at the hollow part 12a of the turret 12, the attachment-part transmission shaft 90 functioning as a drive-force transmission part, and the like; and turns the tool attachment part 15. Turret turning part is configured with the turret turning shaft 23 to which a driving force is input through the turret turning gear 31, the sliding shaft 32, the coupling mechanism (coupling elements 35, 36, 37), and the like. The tool-attachment-part turning part is arranged to oppose the turret turning part along the Z-axis direction.

Further, rotation driving part of the rotatable tool 14a is configured with the tool-rotation drive shaft 21, the bevel gear 30, the bevel gear 40, the tool-rotation transmission shaft 39, and the like. The rotation force is transmitted to the rotation driving part from the tool rotating motor 28 through the pulley 26, the pulley 29, and the belt 27. The rotation driving part is disposed on the turret turning part side by inserting the tool-rotation drive shaft 21 into the turret turning shaft 23.

The turret tool post 10 according to the embodiment is configured as described above. When the rotatable tool 14a supported by the tool attachment part 15 with the rotatable tool device T is turned to the indexing position and then selected, the second clutch 53 is engaged such that the rotation force generated by the tool rotating motor 28 is transmitted from the rotation driving part to the rotatable tool 14a through the rotation-force transmission mechanism 52. Accordingly, the rotatable tool 14a is rotated by the transmitted rotation force and performs cutting process or the like on the workpiece W.

Since the first clutch 51 is engaged, the rotatable tool 14a turns on the turret face 13 together with the rotatable tool device T using the turn-force transmission mechanism 50 by rotating the tool turning motor 41. As a result, it becomes possible to perform processing on the workpiece W under a state in which the rotatable tool 14a is inclined by a predetermined angle relative to the outer circumferential surface of or edge of the workpiece W.

As described above, in this embodiment, the tool-attachment-part turning part is provided on the hollow part 12a side of the turret 12 so as to oppose the turret turning part provided on the post body 11 side. Accordingly, it becomes unnecessary to provide a shaft to turn the tool attachment part 15, a transmission part to transmit the driving force, or the like on the post body 11 side. Furthermore, it becomes possible to locate the tool-attachment-part turning part close to the tool attachment part 15. As a result, it becomes possible to simplify the configuration of the tool-attachment-part turning part.

Note that the tool attachment part 15 and the rotatable tool device T may be configured integrally.

Figure 4:
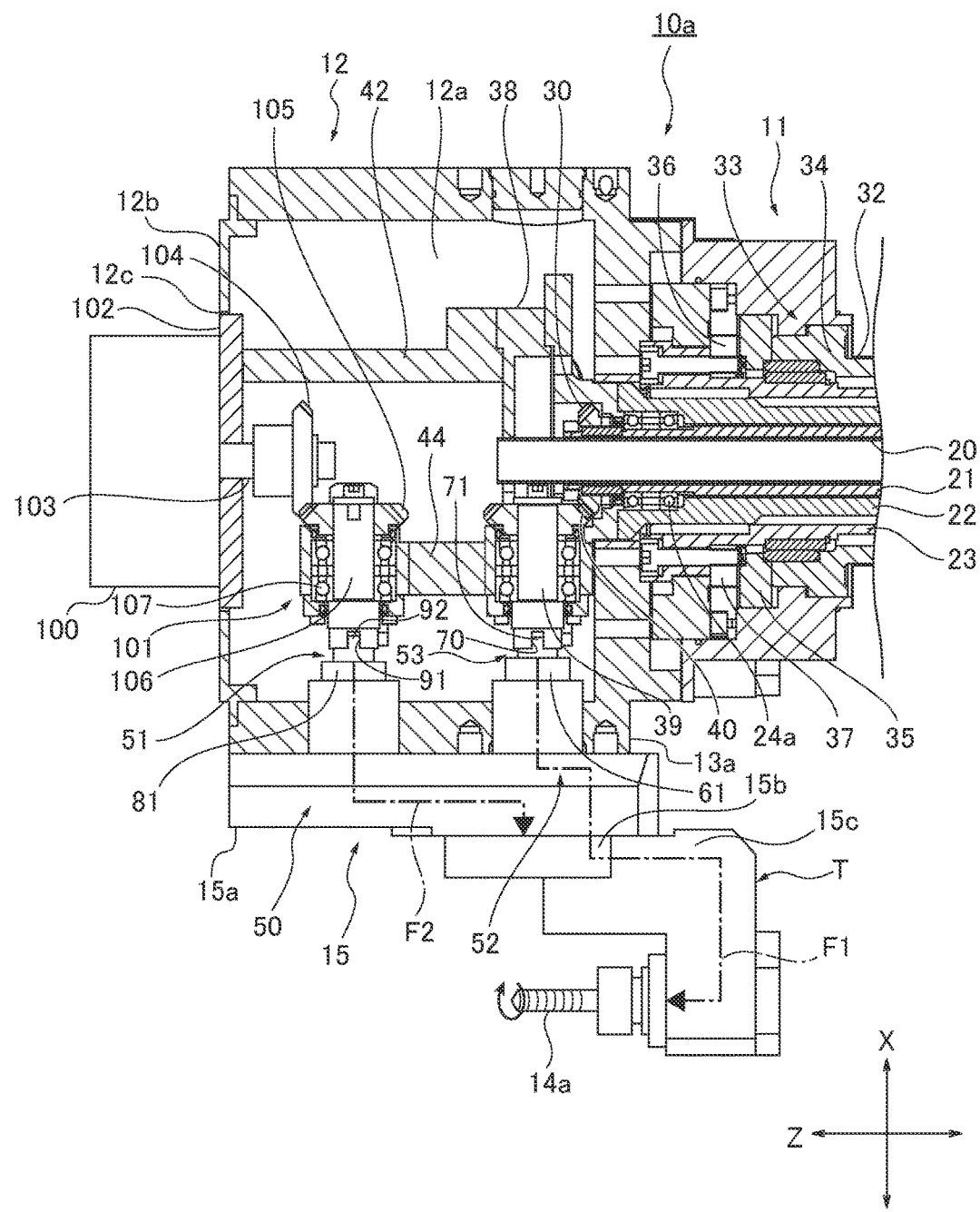
FIG. 4 is a schematic cross-sectional view illustrating a vicinity of a turret attached to a turret tool post according to an embodiment.

FIG. 4 is a schematic cross-sectional view illustrating a vicinity of a turret held by a turret tool post according to an embodiment. The turret tool post 10a of this embodiment is substantially identical to the earlier embodiment, except for the configurations of a tool turning motor 100 and a drive-force transmission part 101 of tool-attachment-part turning part. Hence, the detailed description and illustration of the tool attachment part 15, the rotatable tool device T, and the like are omitted.

In the embodiment, the tool turning motor 100 is disposed on an end face 12b of the turret 12. The tool turning motor 100 is fixed to a fixed plate 102. The fixed plate 102 has a circular shape and is projected from a hole 12c formed on the end face 12b. The fixed plate 102 is fixed to a support part 38 with the bracket 42. The fixed plate 102 is substantially in contact with the hole 12c so as to allow the turret 12 to turn and also prevents, for example, a chip from entering inside the hollow part 12a.

The drive-force transmission part 101 includes a bevel gear 104 attached to a motor shaft 103 of the tool turning motor 100, a bevel gear 105 engaged with the bevel gear 104, and an attachment-part transmission shaft 106 which is attached with the bevel gear 105. The attachment-part transmission shaft 106 is rotatably supported by a supporter 44 with a bearing 107 and is arranged to be substantially in parallel to a tool-rotation transmission shaft 39. Here, the supporter 44 is integrally provided on the support part 38 side. The drive-force transmission part 101 is connected to the motor shaft 103 of the tool turning motor 100 through the bevel gears 104, 105. A groove 91 is formed at one distal end side of the attachment-part transmission shaft 106. With this groove 91 and a tenon-shaped projection 92 that is formed at a distal end of a first turn-force transmission shaft 81 of a turn-force transmission mechanism 50 as similar to Embodiment 1, a first clutch 51 is realized. The first clutch 51 becomes in an engaged state when the groove 91 and the tenon-shaped projection 92 are engaged.

The tool attachment part 15 is attached to the turret face 13. When the rotatable tool 14a held by the tool attachment part 15 with the rotatable tool device T is selected, a tenon-shaped projection 71 of a second clutch 53 is engaged with a groove 70. Accordingly, the second clutch 53 becomes in an engaged state so as to connect the tool-rotation transmission shaft 39 and a tool-rotation transmission shaft 61 of a rotation-force transmission mechanism 52. Further, the tenon-shaped projection 92 is engaged with the groove 91. Accordingly, the first clutch 51 becomes in the engaged state so as to connect the first turn-force transmission shaft 81 and the attachment-part transmission shaft 106.

Note that the detailed structures of the turn-force transmission mechanism 50 and the rotation-force transmission mechanism 52 are substantially identical to those of the embodiment illustrated in FIGS. 2 and 3, and are thereby omitted in this embodiment illustrated in FIG. 4.

As described above, the tool-attachment-part turning part is configured with the tool turning motor 100, the drive-force transmission part 101, and the like provided inside the hollow part 12a and on the end face 12b of the turret 12. Turret turning part is configured with a turret turning shaft 23 to which a driving force is input through a turret turning gear 31, a sliding shaft 32, a coupling mechanism (coupling elements 35, 36, 37), and the like (see FIG. 2). The tool-attachment-part turning part is arranged to oppose the turret turning part along the Z-axis direction.

The turret tool post 10a according to the embodiment is configured as described above. When the rotatable tool 14a supported to the tool attachment part 15 with the rotatable tool device T is selectively turned to the indexing position, a rotation force F1 is transmitted to the rotatable tool 14a from the tool-rotation transmission shaft 39 side through the second clutch 53 and the rotation-force transmission mechanism 52. Accordingly, the rotatable tool 14a is rotated by the transmitted rotation force and performs cutting process or the like on the workpiece W.

When the tool turning motor 100 is rotated, the tool attachment part 15 is turned by a turn force F2 transmitted through the motor shaft 103, the bevel gear 104, the bevel gear 105, the attachment-part transmission shaft 106, the first clutch 51, and the turn-force transmission mechanism 50. Accordingly, the rotatable tool 14a turns on the turret face 13 together with the rotatable tool device T. As a result, it becomes possible to perform processing on the workpiece W under a state in which the rotatable tool 14a is inclined by a predetermined angle relative to the outer circumferential surface of or end face of the workpiece W.

As described above, in this embodiment, the tool-attachment-part turning part is provided inside the hollow part 12a and on the end face 12b of the turret 12 so as to oppose the turret turning part provided on the post body 11 side. Accordingly, it becomes unnecessary to provide a shaft to turn the tool attachment part 15, a transmission part to transmit the driving force, or the like on the post body 11 side. Furthermore, it becomes possible to locate the tool-attachment-part turning part close to the tool attachment part 15. As a result, it becomes possible to simplify the configuration of the tool-attachment-part turning part.

Figure 5:
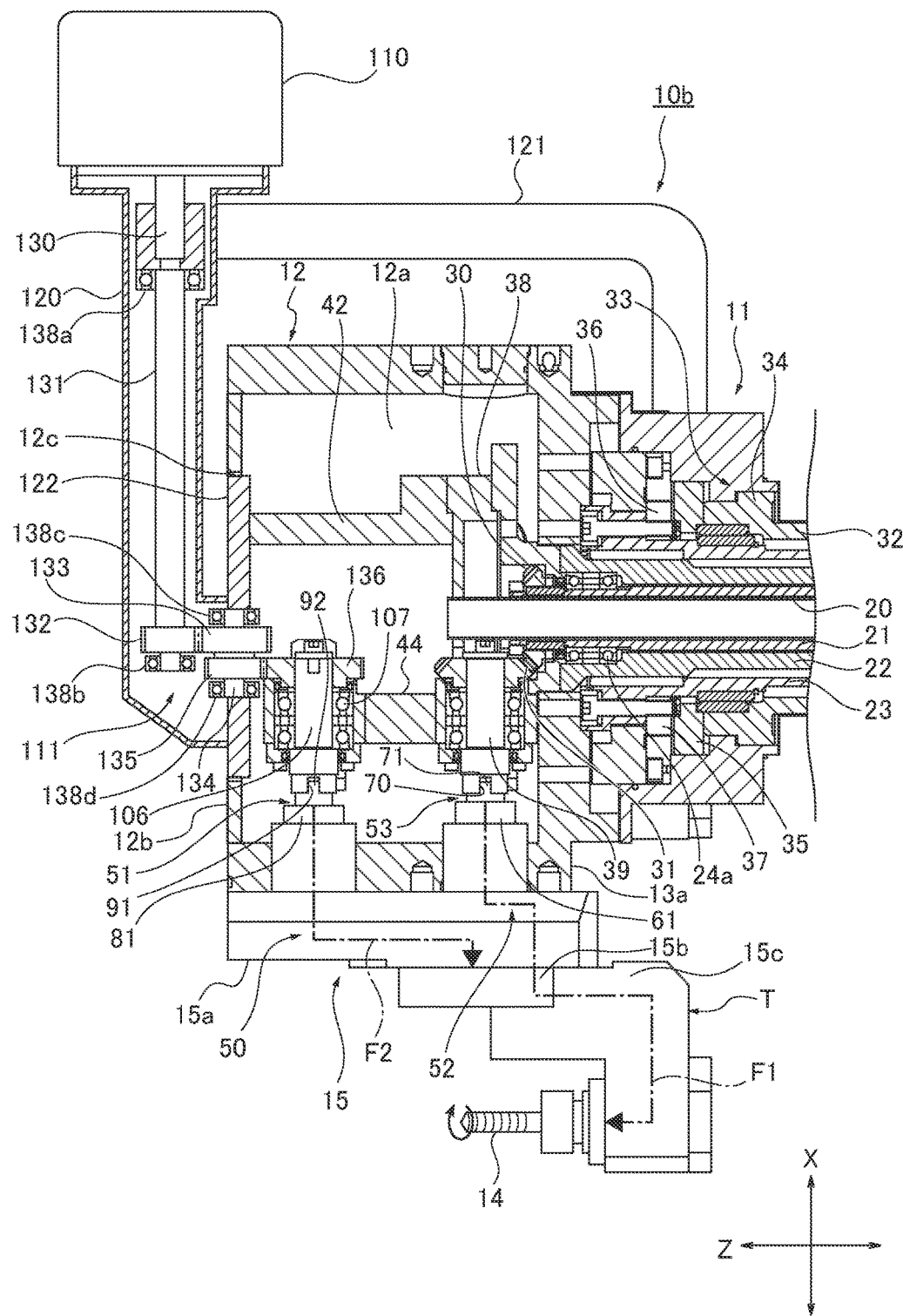
FIG. 5 is a schematic cross-sectional view illustrating a vicinity of a turret attached to a turret tool post according to an embodiment.

FIG. 5 is a schematic cross-sectional view illustrating a vicinity of a turret held by a turret tool post according to an embodiment. The turret tool post 10b of this embodiment is substantially identical to that of the earlier embodiments, except for the configurations of a tool turning motor 110 and a drive-force transmission part 111 of tool-attachment-part turning part. Hence, the detailed description and illustration of the tool attachment part 15, the rotatable tool device T, and the like are omitted.

In the embodiment, the tool turning motor 110 is disposed outside of an end face 12b of the turret 12. The tool turning motor 110 is attached to a hollow cover member 120. The cover member 120 is connected to a distal end side of a supporting member 121 that is fixed on an outer surface of a post body 11 at a base end side thereof. The tool turning motor 110 (i.e., the cover member 120) is supported by and fixed to the post body 11 with the supporting member 121.

One end (at an end face 12b side) of the cover member 120 is fixed to a fixed plate 122. The fixed plate 122 has a circular shape and is projected from a hole 12c formed on the end face 12b. The fixed plate 122 is fixed to a support part 38 with a bracket 42. The fixed plate 122 is substantially in contact with the hole 12c so as to allow the turret 12 to turn and also prevents, for example, a chip from entering inside a hollow part 12a.

The drive-force transmission part 111 includes an attachment-part transmission shaft 131 connected to a motor shaft 130 of the tool turning motor 110, a gear 132 attached to the attachment-part transmission shaft 131, a gear 133 attached to a rotation shaft 134 and engaged with the gear 132, a gear 135 attached to the rotation shaft 134, a gear 136 engaged with the gear 135, and an attachment-part transmission shaft 106 attached to the gear 136.

The attachment-part transmission shaft 131 and the rotation shaft 134 are rotatably supported inside the cover member 120 with bearings 138a, 138b, 138c, 138d. The bearings 138a, 138b, 138c, 138d are provided on the cover member 120 side. The attachment-part transmission shaft 106 is rotatably supported by a supporter 44 with a bearing 107 and is arranged to be substantially in parallel to a tool-rotation transmission shaft 39. Here, the supporter 44 is integrally provided on the support part 38 side. The drive-force transmission part 111 is provided inside the hollow part 12a of the turret 12 and the hollow cover member 120 and is connected to the motor shaft 130 of the tool turning motor 110. A groove 91 is formed at a distal end of the attachment-part transmission shaft 106. With this groove 91 and a tenon-shaped projection 92 that is formed at a distal end of a first turn-force transmission shaft 81 of a turn-force transmission mechanism 50, a first clutch 51 is realized. The first clutch 51 becomes in an engaged state when the groove 91 and the tenon-shaped projection 92 are engaged.

The tool attachment part 15 is attached to a turret face 13. When the rotatable tool 14a held by the tool attachment part 15 with the rotatable tool device T is selected, a tenon-shaped projection 71 of a second clutch 53 is engaged with a groove 70. Accordingly, the second clutch 53 becomes in an engaged state so as to connect the tool-rotation transmission shaft 61 of a rotation-force transmission mechanism 52 and the tool-rotation transmission shaft 39. Further, the tenon-shaped projection 92 is engaged with the groove 91. Accordingly, the first clutch 51 becomes in the engaged state so as to connect the first turn-force transmission shaft 81 and the attachment-part transmission shaft 106.

Note that the detailed structures of the turn-force transmission mechanism 50 and the rotation-force transmission mechanism 52 are substantially identical to those illustrated in FIGS. 2 and 3, and are thereby omitted in this embodiment illustrated in FIG. 5.

As described above, the tool-attachment-part turning part is configured with the tool turning motor 110, the drive-force transmission part 111, and the like provided inside the hollow part 12*a* and outside of the end face 12*b* of the turret 12. Turret turning part is configured with a turret turning shaft 23 to which a driving force is input through a turret turning gear 31, a sliding shaft 32, a coupling mechanism (coupling elements 35, 36, 37), and the like (see FIG. 2). The tool-attachment-part turning part is arranged to oppose the turret turning part along the Z-axis direction.

The turret tool post 10*a* according to the embodiment is configured as described above. When the rotatable tool 14*a* supported to the tool attachment part 15 with the rotatable tool device T is selectively turned to the indexing position, a rotation force F1 is transmitted to the rotatable tool 14*a* from the tool-rotation transmission shaft 39 side through the second clutch 53 and the rotation-force transmission mechanism 52. Accordingly, the rotatable tool 14*a* is rotated by the transmitted rotation force and performs cutting process or the like on the workpiece W.

When the tool turning motor 110 is rotated, the tool attachment part 15 is turned by a turn force F2 transmitted through the motor shaft 130, the attachment-part transmission shaft 131, the gears 132, 133, the rotation shaft 134, the gears 135, 136, the attachment-part transmission shaft 106, the first clutch 51, and the turn-force transmission mechanism 50. Accordingly, the rotatable tool 14*a* turns on the turret face 13 together with the rotatable tool device T. As a result, it becomes possible to perform processing on the workpiece W under a state in which the rotatable tool 14*a* is inclined by a predetermined angle relative to the outer circumferential surface of or end face of the workpiece W.

As described above, in this embodiment, the tool-attachment-part turning part is provided inside the hollow part 12*a* and outside of the end face 12*b* of the turret 12 so as to oppose the turret turning part provided on the post body 11 side. Accordingly, it becomes unnecessary to provide a shaft to turn the tool attachment part 15, a transmission part to transmit the driving force, or the like on the post body 11 side. Furthermore, it becomes possible to locate the tool-attachment-part turning part close to the tool attachment part 15. As a result, it becomes possible to simplify the configuration of the tool-attachment-part turning part.

REFERENCE SIGNS LIST

1 Automatic lathe (Machine tool);
2 Main spindle;
3 Main spindle headstock;
10, 10*a*, 10*b* Turret tool post;
11 Holder body;
12 Turret;
13 Turret face;
14 Tool;
14*a* Rotatable tool;
15 Tool attachment part;
15*a* Outer holder;
15*b* Inner holder;
15*c* Device body;
21 Tool rotation shaft;
23 Turret turning shaft;
28 Tool rotating motor;
39 Tool-rotation transmission shaft;
41, 100, 110 Tool turning shaft;
50 Turn-force transmission mechanism;
51 First clutch;
52 Rotation-force transmission mechanism;
53 Second clutch;
61 Rotation-force transmission shaft;
62 First rotation-force transmission shaft;
63 Second rotation-force transmission shaft;
101, 111 Drive-force transmission part;
90, 106 Attachment-part transmission shaft;
120 Cover member;
121 Supporting member;
T Rotatable tool device;
W Workpiece;
C Main-spindle axis line;
F1 Rotation force;
F2 Turning force

What is claimed is:

1. A turret tool post of a machine tool, comprising:
a post body;
a turret turnably supported on the post body, the turret including a circumferential surface comprising a plurality of turret faces;
a turret turning shaft and a turret turning gear configured to turn the turret about a first axis;
a plurality of tool attachments attached to the plurality of turret faces, the plurality of turret faces each being configured to be attachable with a respective tool attachment, at least one of the plurality of the tool attachments configured to turnably hold a rotatable tool, the rotatable tool configured to be selected by turning the turret about the first axis:
a tool attachment turning part configured to turn the at least one of the plurality of the tool attachments about a second axis; and
a rotation driving part configured to rotate the rotatable tool about a third axis,
wherein:
the tool attachment turning part includes a tool turning motor, a tool attachment transmission shaft, and a tool attachment turning gear, wherein the tool attachment transmission shaft and the tool attachment turning gear are disposed on the turret, the tool attachment turning part being configured to turn the rotatable tool about the second axis,
the rotation driving part includes a tool rotating motor, a tool-rotation drive shaft, and a tool-rotation gear, the rotation driving part configured to rotate the rotatable tool to process a material,
the turret turning shaft and turret turning gear are disposed on the post body,
the turret turning shaft includes a hollow portion into which the tool-rotation drive shaft is inserted, and
the tool rotating motor is disposed at a side of the post body opposite to a side of the post body at which the turret and the tool turning motor are located.

2. The turret tool post according to claim 1, wherein the tool turning motor is positioned inside the turret, and the tool attachment transmission shaft and the at least one of the plurality of the tool attachments are connected to the tool turning motor.

3. The turret tool post according to claim 1, wherein the tool turning motor is located at an end face of the turret, the tool attachment transmission shaft and tool attachment turning gear are connected to the tool turning motor, and the tool attachment transmission shaft and tool attachment turning gear are disposed inside the turret.

4. The turret tool post according to claim 1, wherein the tool turning motor is disposed on the post body with a supporting member, the tool attachment transmission shaft and tool attachment turning gear are connected to the tool turning motor, and at least a part of the tool attachment transmission shaft and tool attachment turning gear are disposed inside the turret.

5. A machine tool comprising the turret tool post according to claim 1, wherein
the machine tool is configured to select the rotatable tool by turning the turret about the first axis, is configured to turn the rotatable tool about the second axis using the at least one of the plurality of the tool attachments, and is configured to process a material by rotating the rotatable tool about the third axis.

6. A turret tool post assembly of a machine tool used to process material, the turret tool post assembly comprising:
a post body having a first end and a second end spaced from the first end in a direction of a first axis, the first end being opposite to the second end;
a turret located on the first end of the post body, the turret configured to be turnable about the first axis;
a plurality of tools attached to the turret, at least one of the plurality of tools comprising a rotatable tool, the rotatable tool configured to rotate about a second axis;
a tool attachment part configured to rotatably attach the rotatable tool to the turret, the tool attachment part configured to turn about a third axis;
a tool rotating motor located at the second end of the post body, the tool rotating motor configured to drive the rotatable tool by rotating the rotatable tool about the second axis; and
a tool turning motor located on the first end of the post body, the tool turning motor configured to swivel the rotatable tool by turning the tool attachment part about the third axis,
wherein the turret turns about the first axis to select one of the plurality of tools to be used to process the material, and
wherein, when the rotatable tool is selected, the rotatable tool rotates about the second axis and swivels about the third axis to process the material.

7. The turret tool post assembly of claim 6, further comprising a turret turning motor configured to turn the turret about the first axis.

8. The turret tool post assembly of claim 7, wherein the turret turning motor provides, at a position between the tool rotating motor and the tool turning motor, a drive force to a turret turning gear.

9. The turret tool post assembly of claim 6, wherein the tool turning motor is positioned inside the turret.

10. The turret tool post assembly of claim 6, wherein the tool turning motor is located at an end face of the turret.

11. The turret tool post assembly of claim 6, wherein the tool turning motor is fixed to the post body.

12. The turret tool post assembly of claim 6, wherein the rotatable tool is configured to perform a cutting process.

13. The turret tool post assembly of claim 12, wherein the rotatable tool comprises an end mill.

14. The turret tool post assembly of claim 6, wherein the rotatable tool is detachable from the tool attachment part.

15. A machine tool comprising the turret tool post assembly according to claim 6.

* * * * *

UNITED STATES PATENT AND TRADEMARK OFFICE
CERTIFICATE OF CORRECTION

PATENT NO. : 10,213,887 B2
APPLICATION NO. : 15/129377
DATED : February 26, 2019
INVENTOR(S) : Atsushi Aoyagi Page 1 of 1

It is certified that error appears in the above-identified patent and that said Letters Patent is hereby corrected as shown below:

In the Specification

Column 7, Line 9, change "Embodiment" to --embodiment--.

In the Claims

Column 10, Line 34, in Claim 1, change "axis:" to --axis;--.

Signed and Sealed this
Twenty-fifth Day of June, 2019

Andrei Iancu
*Director of the United States Patent and Trademark Office*